United States Patent

[11] 3,548,711

| [72] | Inventor | Herman J. Baldwin<br>Cincinnati, Ohio |
|---|---|---|
| [21] | Appl. No. | 775,701 |
| [22] | Filed | Nov. 14, 1968 |
| [45] | Patented | Dec. 22, 1970 |
| [73] | Assignee | Cincinnati Milacron Inc.<br>Cincinnati, Ohio<br>a corporation of Ohio |

[54] MACHINE TOOL SPINDLE APPARATUS
8 Claims, 7 Drawing Figs.

[52] U.S. Cl. .................................................... 90/14,
90/11; 77/3
[51] Int. Cl. .................................................... B23c 1/02
[50] Field of Search ............................................ 90/11.1, 14,
11; 77/3, 3.1, 4; 308/(Inquired)

[56] References Cited
UNITED STATES PATENTS
2,699,694  1/1955  Schraub ........................  77/3

| 3,034,408 | 5/1962 | Kampmeier .................. | 90/11-1 |
|---|---|---|---|
| 3,124,015 | 3/1964 | Mottu ............................ | 77/4 |
| 3,222,956 | 12/1965 | Dever et al. .................. | 77/4 |
| 3,455,207 | 7/1969 | Meinke ......................... | 90/14 |

FOREIGN PATENTS

| 848,533 | 9/1969 | Great Britain ................ | 90/14 |

Primary Examiner—Gil Weidenfeld
Attorney—Frank C. Leach, Jr.

ABSTRACT: An intermediate spindle or support is disposed between a quill and a spindle in a bar-type milling machine. The intermediate spindle is rotatable with the spindle and is axially movable with the quill. When a cutting tool of relatively large diameter in comparison with the diameter of the spindle is required, an adapter plate connects the ends of the spindle and the intermediate spindle to each other to cause the intermediate spindle and the quill to move axially with the spindle, which normally moves axially relative to the intermediate spindle and the quill.

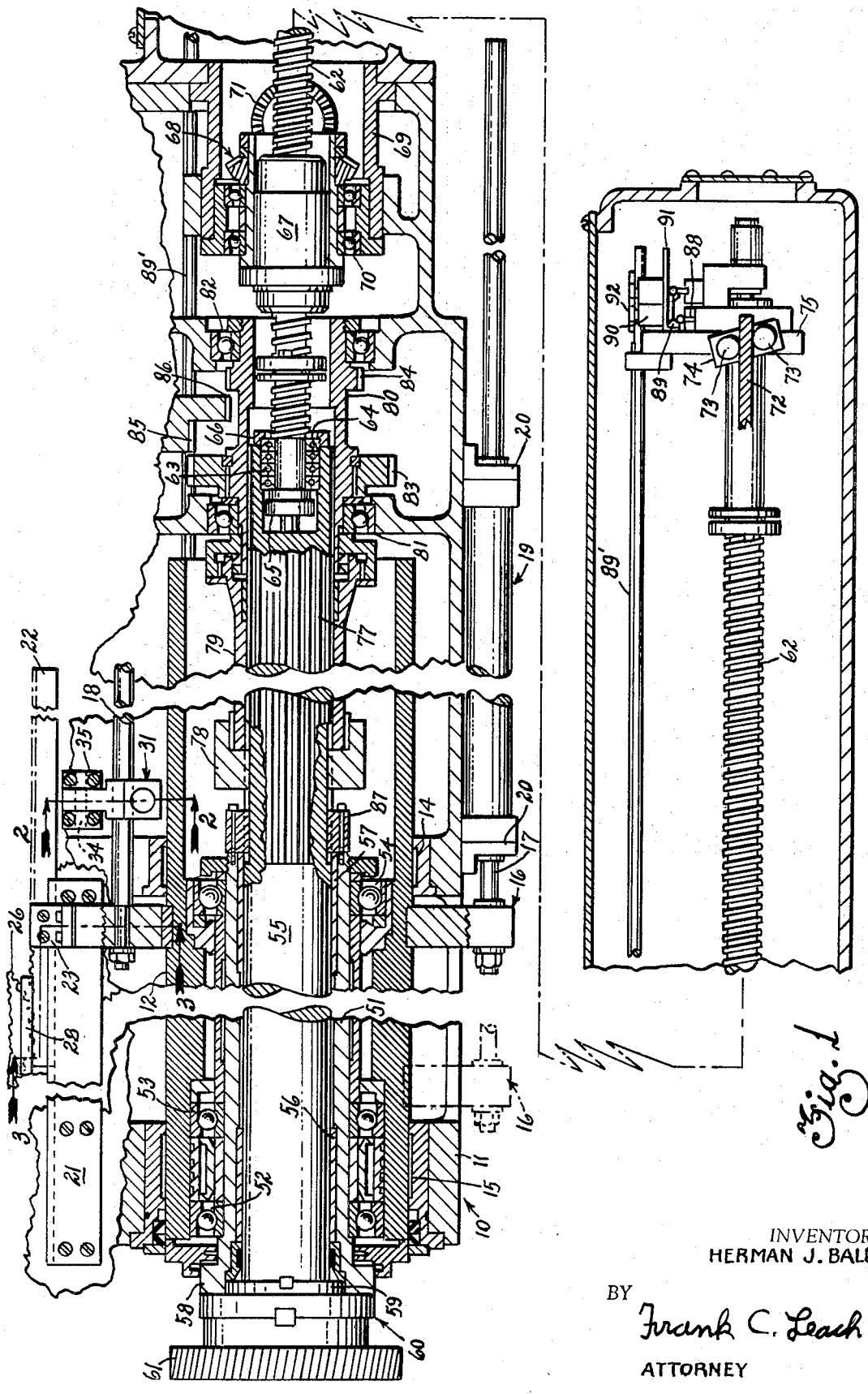

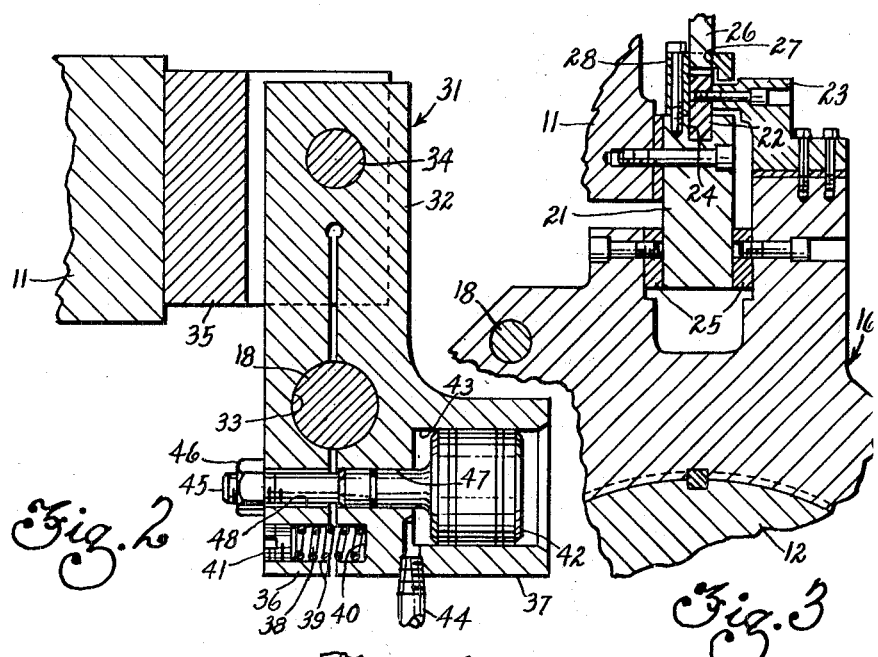
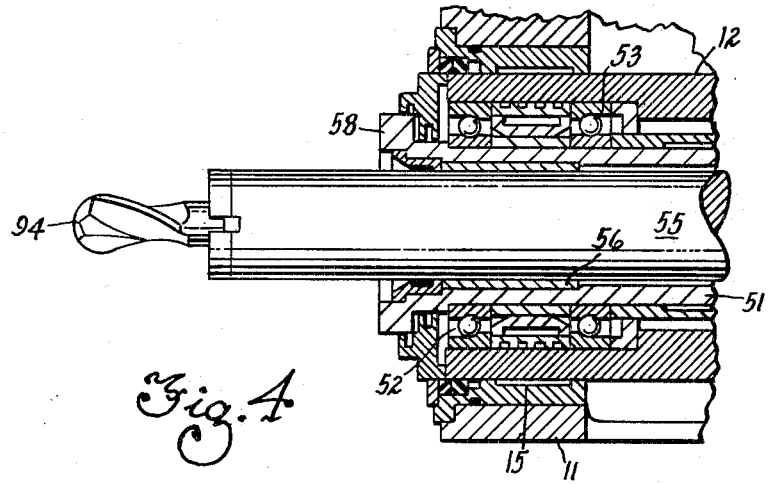
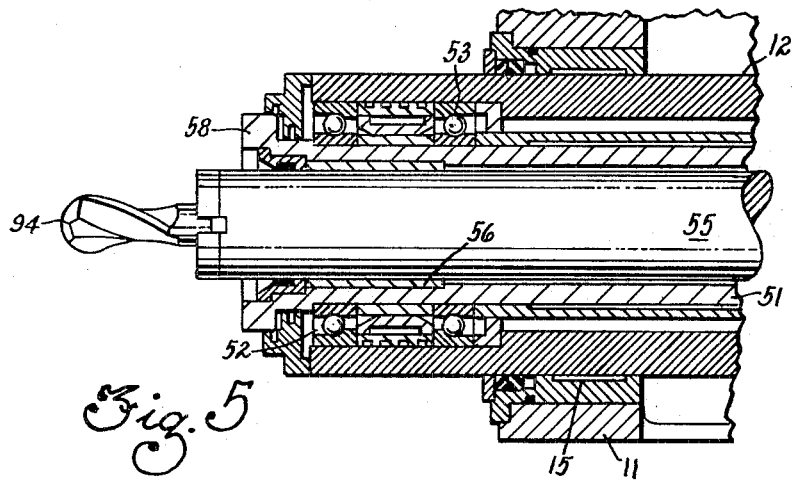

MACHINE TOOL SPINDLE APPARATUS

In bar-type milling machines, the spindle conventionally has a relatively long axial feed stroke for forming bore or deep hole pockets in a workpiece. One type of spindle having such a long axial feed stroke is shown and described in U.S. Pat. No. 3,222,956 to Dever et al.

In order to form bores and deep hole pockets of relatively small diameter in a workpiece, it is necessary for the spindle to be of relatively small diameter and slightly less in diameter than the size of the cutting tool, which may be a ball end mill, for example.

In order to have utility from a bar-type milling machine, it also is desirable for the spindle to be capable of high-horsepower cuts in which the quill is extended a substantial distance from the carrier housing to provide support to the spindle during high-horsepower cuts. These high-horsepower cuts are performed in operations such as roughing, for example, when it is desired to remove a surface from the workpiece.

It is necessary for the spindle to support a cutting tool such as a mill, for example, of relatively large diameter in comparison with the diameter of the spindle to perform high-horsepower cuts. However, since it is necessary for the quill to be extended from the carrier housing to provide support to the spindle during this high-horsepower cutting operation, the size of the cutting tool has been limited because of the presence of the quill.

If the quill is not extended from the carrier housing to provide the desired support to the spindle, high-horsepower cutting cannot be performed satisfactorily. This is because the absence of the quill would result in the spindle deflecting and being subjected to substantial vibrations whereby the accuracy of the cut would be lost.

The present invention satisfactorily solves the foregoing problem by providing a unique support construction for a spindle of a machine tool such as a bar-type milling machine, for example. When the spindle support arrangement of the present invention is utilized, a single bar-type milling machine is capable of both forming bores and deep hole pockets of relatively small diameter and performing high-horsepower cuts with sufficient support for the spindle.

The present invention utilizes an intermediate spindle or support between the spindle and the quill so that the intermediate spindle or support may be utilized with the spindle to support the spindle when high-horsepower cuts are to be performed. However, when forming a deep hole pocket, for example, the intermediate spindle is not utilized other than as a support for the spindle along with the quill.

Accordingly, the present invention permits a single boring machine to be capable of cutting deep hole pockets and bores with a tool of relatively small diameter and obtaining high-horsepower cuts with the quill extended a sufficient distance to properly support the spindle during such high-horsepower cuts.

An object of this invention is to provide a unique support construction for a spindle.

Another object of this invention is to provide a spindle having different types of support, depending on the cutting operation, when the spindle is in the extended position from its housing.

Other objects of this invention will be readily perceived from the following description, claims, and drawings.

This invention relates to a spindle mechanism for a machine tool or the like including a quill and means to allow the quill to move only axially. The quill has an intermediate spindle rotatably mounted therein. A spindle is disposed within the intermediate spindle and adapted to have a cutting tool or the like secured thereto. Means connects the intermediate spindle to the spindle for rotation therewith by suitable means while permitting relative axial movement therebetween.

The attached drawings illustrate a preferred embodiment of the invention, in which:

FIG. 1 is a longitudinal sectional view of a spindle carrier of a bar-type milling machine and showing the unique support construction of the present invention;

FIG. 2 is a sectional view taken along line 2-2 of FIG. 1 and illustrating clamping means to prevent inadvertent axial movement of the quill;

FIG. 3 is a sectional view taken substantially along line 3-3 of FIG. 1 and showing means for preventing rotation of the quill;

FIG. 4 is a fragmentary sectional view of the left portion of FIG. 1 and showing the spindle extended for forming a deep hole pocket or bore;

FIG. 5 is a fragmentary sectional view, similar to FIG. 4, but showing the quill and the intermediate support extended to provide additional support to the spindle during formation of a deep hole pocket or bore;

Figure 7:
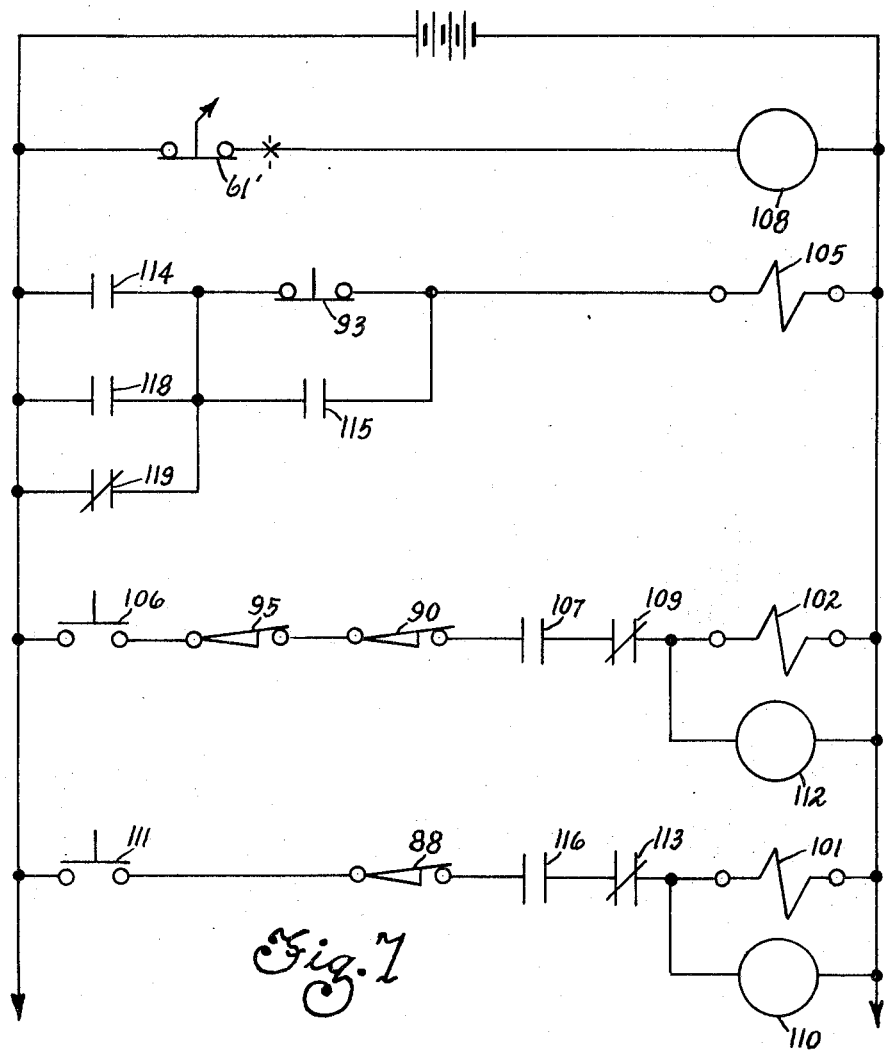
FIG. 7 is a schematic wiring diagram of an electrical control circuit used in the present invention.

Referring to the drawings and particularly FIG. 1, there is shown a spindle carrier 10, which may be mounted for vertical movement in the manner more particularly shown and described in the copending patent application of Lewis A. Dever for "Heat Expansion Determining Means," Ser. No. 775,702, filed Nov. 14, 1968, and assigned to the same assignee as the assignee of the present application. The spindle carrier 10 also is movable along a horizontal track in the same manner as other bar-type milling machines.

The spindle carrier 10 includes a housing 11 having a quill 12 disposed therein in spaced relation thereto. The quill 12 is supported within the housing 11 by a pair of hydrostatic bearings 14 and 15. The hydrostatic bearings 14 and 15 support the quill 12 for axial movement within the housing 11.

The quill 12 has an annular-shaped yoke 16 fixedly attached thereto. The yoke 16 has rods 17 and 18 secured thereto and extending from one side thereof. The rod 17 extends through a cylinder 19, which is supported from the housing 11 by aprons 20, to which hydraulic fluid may be supplied to either end thereof to act on a piston carried by the rod 17 and fixed thereto. Thus, the quill 12 may be moved axially by supplying fluid to one end or the other of the cylinder 19 while removing fluid from the other end.

Rotation of the quill 12 is prevented through cooperation between a guide rail 21 (see FIG. 3), which is fixedly secured to the housing 11, and a rack 22, which is fixedly secured to the yoke 16 by a bracket 23. The rack 22 rides in an axial slot 24 in the upper surface of the guide rail 21. The guide rail 21 also slides between wear plates 25, which are secured to the yoke 16.

In order for the operator to determine the amount of axial movement of the quill 12, a gear 26 is rotatably mounted in the housing 11. The gear 26 meshes with the rack 22 whereby the gear 26 rotates in accordance with the amount of axial movement of the quill 12 and the direction of axial movement. The gear 26 extends through a slot 27 in a rail support 28, which is fixed to the upper surface of the guide rail 21.

The shaft of the gear 26 is connected to an indicating dial on the spindle carrier 10. Thus, as the indicating dial rotates with the gear 26, the amount of axial movement of the quill 12 and its direction is indicated to the operator through a fixed pointer cooperating with the indicating dial.

Accordingly, the guide rail 21 prevents the quill 12 from rotating. Furthermore, by mounting the rack 22 in the axial slot 24 of the guide rail 21, the axial movement of the quill 12 is readily transmitted through the rack 22 to the gear 26.

The rod 18 extends through a clamping assembly 31, which is carried by the housing 11. As shown in FIG. 2, the clamping assembly 31 includes a block 32 having a passage 33 extending therethrough to receive the rod 18.

The block 32 has a pin 34 disposed in its upper end for attachment to a bracket 35, which is fixed to the housing 11. Thus, the block 32 is carried by the housing 11.

The block 32 is split from its lower end to a position above the passage 33 to form split portions 36 and 37. As a result, the split portions 36 and 37 of the block 32 are separated from each other so as to move relative to each other at their lower ends. A spring 38, which is disposed within a passage 39 in the portion 36 and a receptacle 40 in the portion 37 of the block 32, continuously urges the portion 37 away from the portion 36 so that the rod 18 is not clamped in the passage 33. A set screw 41 closes one end of the passage 39 to retain the spring 38 within the passage 39 and the receptacle 40.

The portion 37 of the block 32 has a piston 42 disposed within a cylindrical recess 43 for sliding movement therein. When fluid is supplied through a hose 44 to the recess 43, the piston 42 is moved to the right (as viewed in FIG. 2). The piston 42 has a rod 45, which is threaded on its end to receive a nut 46, extending through aligned passages 47 and 48 in the portions 37 and 36, respectively, of the block 32. Therefore, when the piston 42 is moved to the right (as viewed in FIG. 2) due to fluid being supplied through the hose 44, the spring 38 is overcome and the portion 36 is moved toward the portion 37 by the piston 42 to clamp the rod 18 within the passage 33.

Accordingly, when it is desired to prevent movement of the quill 12 in an axial direction, fluid is supplied through the hose 44 to the cylindrical recess 43 in the block 32. This supply of fluid to the recess 43 occurs automatically when axial movement of the quill 12 is stopped due to stopping flow of fluid to the hydraulic cylinder 19. Thus, the clamping assembly 31 automatically clamps the rod 18 to prevent any axial movement of the quill 12 after axial movement of the quill 12 is stopped through stopping supply of fluid to the hydraulic cylinder 19.

An intermediate spindle or support 51 is disposed in spaced relation to the quill 12 and rotatably mounted thereon by a plurality of horizontally spaced bearings 52, 53, and 54. Thus, the intermediate spindle 51 is adapted to be rotated relative to the quill 12. Because of the mounting arrangement of the bearings 52, 53, and 54, any axial movement of the quill 12 is transmitted to the intermediate spindle 51 through the bearings 52, 53, and 54.

A bar-type spindle 55 is disposed within the intermediate spindle 51. A pair of bronze bushings 56 and 57 on opposite ends of the spindle 55 maintains the intermediate spindle 51 in spaced relation to the spindle 55. As shown in FIG. 1, the intermediate spindle 51 has its left end 58 enlarged to receive portion 59 of an adapter plate 60, which is secured to the end 58 of the intermediate spindle 55. The portion 59 of the adapter plate 60 is secured to the spindle 55 so that the adapter plate 60 connects the spindle 55 and the intermediate spindle 51 to each other.

When this occurs, a cutting tool 61, which has a large diameter in comparison to the diameter of the spindle 51 and may be a mill, for example, may be secured to the adapter plate 60. Thus, the support construction of the present invention permits utilization of a cutting tool, which has a relatively large diameter in comparison to the diameter of the spindle 55, when the adapter plate 60 is employed.

As shown in FIG. 1, the spindle 55 extends throughout the length of the quill 12 and beyond each end thereof. Likewise, the end 58 of the intermediate spindle 51 extends beyond the quill 12 while the remainder of the intermediate spindle 51 is disposed within the quill 12.

The spindle 55 is moved axially by an axial feed means. When the adapter plate 60 is connected to the spindle 55 and the intermediate spindle 51, the axial movement of the spindle 55 by the axial feed means also moves the intermediate spindle 51 and the quill 12 axially. In order to axially move the intermediate spindle 51 and the quill 12 with the spindle 55, it is necessary to release the clamping assembly 31 through a selector switch 61' (see FIG. 7) whereby the fluid is removed from the recess 43 even though no fluid is supplied to the hydraulic cylinder 19.

When the adapter plate 60 is not utilized, there is no connection between the spindle 55 and the intermediate spindle 51. Accordingly, in this arrangement, which is shown in FIGS. 4 and 5, the axial feed means of the spindle 55 axially moves only the spindle 55.

The axial feed means includes a feed screw 62, which is connected directly to the rear end of the spindle 55. The feed screw 62 is rotatably received in the spindle 55 by a set of bearings 63, which are adapted to transmit axial thrust forces between the spindle 55 and the feed screw 62.

The bearings 63 are fixedly mounted on the end of the feed screw 62 and disposed within a receptacle 64 in the rear end of the spindle 55. The bearings 63 are retained on the feed screw 62 by a nut 65. A retaining ring 66 retains the bearings 63 inside of the receptacle 64 of the spindle 55. Accordingly, the feed screw 62 is axially movable with the spindle 55 but the spindle 55 is rotatable with respect to the feed screw 62.

A recirculating ball bearing nut 67 is disposed over a portion of the feed screw 62, which is a conventional ball bearing feed screw, in surrounding relation thereto and is rotatable with respect to the feed screw 62. The ball bearing nut 67 has a gear member 68 fixedly secured thereto in surrounding relation thereto. The gear member 68 is rotatably supported in a housing 69, which is fixedly supported within the housing 11 of the carrier 10, by bearings 70.

When the gear member 68 is rotated by a gear 71, which is driven by a motor (not shown), the nut 67 and the gear member 68 are rotated. Since the feed screw 62 is prevented from rotation by suitable means, the rotation of the gear member 68 and the nut 67 results in the feed screw 62 producing axial movement of the feed screw 62 and spindle 55. Thus, when it is desired to extend or retract the spindle 55, the feed screw 62 is driven through the nut 67 to produce the desired axial movement of the spindle 55.

The means for preventing rotation of the feed screw 62 when the nut 67 is rotated includes diametrically disposed support rails (one shown at 72) extending from opposite sides of the housing 11. Each of the support rails 72 extends between a pair of cam rollers 73, which are mounted on the feed screw 62. Since the rail 72 is fixed to the housing 11 and the cam rollers 73 are attached to the feed screw 62, the feed screw 62 cannot rotate when the ball nut 67 is rotated.

Each pair of the cam rollers 73 is mounted on a pivot block 74. The pair of pivot blocks 74 is mounted on a support block 75, which is carried by the feed screw 62 as more particularly shown in the aforesaid Dever patent application.

In order to drive the cutting tool 61, it is necessary to rotate the spindle 55 and the intermediate spindle 51. The rotational drive means is applied directly to the spindle 55. The spindle 55 is coupled to the intermediate spindle 51 through the adapter plate 60 to apply the rotational drive thereto.

The spindle 55 has its rear portion 77 splined. The rear portion 77 has its splines cooperating with teeth on a surrounding mating member 78. The member 78 has a toothed engagement with a cylindrical-shaped member 79, which also surrounds a portion of the rear portion 77 of the spindle 55. The cylindrical-shaped member 79 has toothed engagement with a cylindrical-shaped member 80, which is rotatably supported within the housing 11 of the carrier 10 by bearings 81 and 82.

The cylindrical-shaped member 80 has a pair of horizontally spaced gears 83 and 84 thereon. The gear 83 is preferably formed separate from the member 80 and keyed thereto while the gear 84 is preferably formed integral with the member 80.

When the gear 83 is engaged by a gear 85, the spindle 55 is rotated at one speed. Engagement of a gear 86 with the gear 84 results in rotation of the spindle 55 at a second speed, which is different than the first speed.

The gears 85 and 86 are mounted on a shaft (not shown) for rotation therewith but are adapted to be moved axially relative to the rotating shaft as more particularly shown and described in the aforesaid Dever patent. Thus, the gear 85 may be moved into engagement with the gear 83 or the gear 86 moved into engagement with the gear 84.

It should be understood that a multispeed transmission is utilized between a spindle motor (not shown) and the gears 85 and 86 to rotate the gears 85 and 86 at various speeds. Thus, a plurality of different rates of rotation is available for rotating the spindle 55.

The intermediate spindle 51 is driven from the spindle 55 through forming the inner surface of a member 87, which is carried on the end of the intermediate spindle 51, with splines, which cooperate with the splines on the rear portion 77 of the spindle 55. Thus, rotation of the spindle 55 is transmitted to the intermediate spindle 51.

Accordingly, the support construction of the present invention permits the bar-type milling machine to be readily utilized for either removing a surface of a workpiece by a high-horsepower cut or forming a bore of small diameter or a deep hole pocket of small diameter within the workpiece. When the workpiece is to have a surface removed by roughing, for example, the adapter plate 60 has its smaller portion 59 attached to the end of the spindle 55 and its larger portion connected to the end 58 of the intermediate spindle 51.

It is necessary for the end 58 of the intermediate spindle 51 to extend beyond the end of the spindle 55 for the adapter plate 60 to be attached to both. Thus, the intermediate spindle 51 must be disposed in the position of FIG. 1 when it is desired to attach the adapter plate 60 to the spindle 55 and the intermediate spindle 51.

Accordingly, fluid is supplied to the hydraulic cylinder 19 to dispose the intermediate spindle 51 in the position of FIG. 1. The supply of fluid to the hydraulic cylinder 19 retracts both the intermediate spindle 51 and the quill 12 until a limit switch 88 (see FIGS. 1 and 7), which is supported by the housing 11, is engaged by a cam 89 on a rod 89', which is supported by the yoke 16 for movement with the quill 12, to stop fluid flow to the cylinder 19. The limit switch 88 is engaged by the cam 89 on the rod 89' when the intermediate spindle 51 is in the position of FIG. 1.

It is then necessary to retract the spindle 55 into the intermediate spindle 51 so that the spindle 55 is disposed in the position of FIG. 1. It should be understood that the spindle 55 normally has its end disposed beyond the end 58 of the intermediate spindle 51 as shown in FIG. 5.

In order to move the spindle 55 inside of the intermediate spindle 51, it is necessary to inactivate a limit switch 90 (see FIGS. 1 and 7), which is carried by the feed screw 62 through being mounted on a support plate 91 of the bracket 75 and normally engaged by an arm 92 on the rod 89' to stop retraction of the spindle 55, by opening the selector switch 61'. When the operator opens the selector switch 61' to inactivate the limit switch 90, the spindle 55 is moved rearward further until another limit switch (not shown) on the support plate 91 on the feed screw 62 is engaged by another arm (not shown) on the rod 89'. Of course, the rearward movement of the spindle 55 by the feed screw 62 is by rotating the nut 67. Furthermore, the opening of the switch 61' with a push button 93 remaining closed results in removal of fluid from the recess 43 in the clamping assembly 31 whereby the quill 12 and the intermediate spindle 51 are not clamped against axial movement.

After the arm on the rod 89' engages the second limit switch, due to rearward movement of the spindle 55, to stop retraction of the spindle 55 in the position shown in FIG. 1, the adapter plate 60 is attached to both the spindle 55 and the intermediate spindle 51. Accordingly, with the adapter plate 60 attached to both the spindle 55 and the intermediate spindle 51, the quill 12 and the intermediate spindle 51 are free to move with the spindle 55 as it is advanced outward from the housing 11 by the feed screw 62.

Thus, rotation of the nut 67 axially feeds the spindle 55 to move the cutting tool 61 into cutting engagement with the workpiece. Since the intermediate spindle 51 is attached to the spindle 55 through the adapter plate 60, the intermediate spindle 51 also moves therewith. Because of the mounting arrangement of the bearings 52, 53, and 54, axial movement of the intermediate spindle 51 also moves the quill 12. Thus, the support construction of the present invention permits the cutting tool 61 to have a relatively large diameter with respect to the spindle 55 while still receiving support so as to be capable of high-horsepower cutting operations such as roughing, for example.

Of course, the operating speed of the cutting tool 61 is determined by whether the gear 85 is engaged with the gear 83 or the gear 86 is engaged with the gear 84 and the position of the multispeed transmission. Since the multispeed transmission is used, a plurality of different speeds of rotation is available during the cutting operation.

When only the spindle 55 has a cutting tool 94, which may be a ball end mill, for example, attached thereto as shown in FIGS. 4 and 5, the axial movement of the spindle 55 does not affect the axial movement of the intermediate spindle 51 or the quill 12. Instead, movement of the intermediate spindle 51 and the quill 12 to the position of FIG. 5 from the position of FIG. 4 can be accomplished only through supplying fluid to the hydraulic cylinder 19. When this occurs, fluid is removed from the recess 43 to unclamp the rod 18 whereby the quill 12 and the intermediate spindle 51 may be moved axially.

It should be understood that the amount of axial movement of the quill 12 and the intermediate spindle 51 must be controlled so that the end 58 of the intermediate spindle 51 does not advance relative to the spindle 55 beyond the position shown in FIG. 5. Accordingly, the limit switch 90, which is effective to limit the retraction of the spindle 55 to the relationship shown in FIG. 5 with respect to the intermediate spindle 51, also is employed to prevent the intermediate spindle 51 from being advanced further than the spindle 55. This is because the limit switch 90, which is carried on the feed screw 62, would be engaged by the arm 92 on the rod 89', which moves with the intermediate spindle 51, when the intermediate spindle 51 reaches the position in which it has the relationship with the spindle 55 of that shown in FIG. 5.

The maximum extension of the intermediate spindle 51 and the quill 12 is determined by engagement of a limit switch 95 (see FIG. 7), which is carried by the housing 11, with a cam on the rod 89'. This insures that the spindle 51 and the quill 12 are not extended from the housing 11 beyond this maximum.

Similarly, the maximum outward movement of the spindle 55 is limited by a limit switch (not shown), which is carried by the housing 11. When this limit switch is engaged by an arm on the bracket 75 of the feed screw 62, outward movement of the spindle 55 is stopped.

Inward movement of the quill 12 and the intermediate spindle 51 is limited, as previously mentioned, by the limit switch 88, which is carried by the housing 11. Since the limit switch 90 limits the rearward movement of the feed screw 62 relative to the rod 89' and the forward movement of the rod 89' relative to the feed screw 62, the feed screw 62 cannot retract the spindle 55 rearward relative to the intermediate spindle 51 beyond that shown in FIG. 5.

Figure 6:
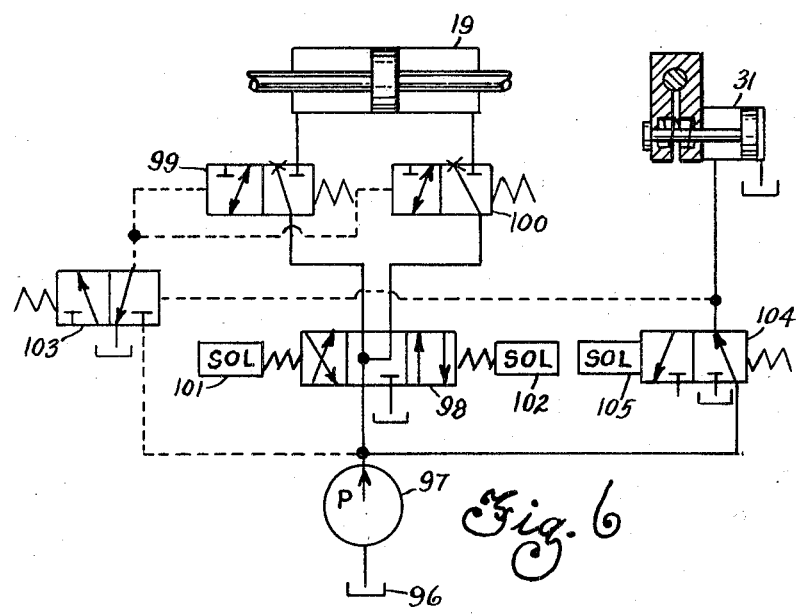
FIG. 6 is a schematic view of a hydraulic system utilized in the present invention.

The control of the clamping assembly 31 and the position of the cylinder 19, which governs movement of the quill 12 and the intermediate spindle 51 when the adapter plate 60 is not employed, by the various switches is schematically shown in FIGS. 6 and 7. As shown in FIG. 6, a fluid source 96 is connected through a pump 97 and valves 98, 99, and 100 to the hydraulic cylinder 19. The position of the valve 98 is controlled by solenoids 101 and 102.

The valves 99 and 100 block fluid flow to the cylinder 19 unless a valve 103 is moved to a position in which fluid may be supplied from the source 96 through the valve 103 to position the valves 99 and 100 to receive fluid. The valve 103 is moved to a position in which fluid may be pumped from the pump 97 through the valves 103 to the valves 99 and 100 when a valve 104 is moved from the position of FIG. 6 by energization of a solenoid 105. When this occurs, the valve 103 no longer is held in the position of FIG. 6 by fluid from the pump 97 flowing through the valve 104.

Thus, when it is desired to either extend or retract the quill 12 in the intermediate spindle 51, the solenoid 105 must be energized. This releases the quill 12 and the intermediate spindle 51 for axial movement since the valve 104 no longer allows fluid to be supplied to the clamping assembly 31 but is positioned to drain fluid from both the clamping assembly 31 and from the control for the valve 103. Accordingly, when it is desired to extend or retract the quill 12 and the intermediate spindle 51, the energization of the solenoid 105 allows the quill 12 to be free for axial movement and the valves 99 and 100 to be positioned to receive fluid from the pump 97 through the valve 98.

When extension of the quill 12 and the intermediate spindle 51 from the housing 11 is desired, the solenoid 102 is energized to position the valve 98 so that the fluid from the pump 97 is directed into the cylinder 19 through the valve 100 and is removed from the cylinder 19 through the valve 99. When it is desired to retract the quill 12 and the intermediate spindle 51 into the housing 11, the solenoid 101 is energized to supply the fluid through the valve 99 to the cylinder 19 and remove the fluid from the cylinder 19 through the valve 100. Thus, during either extension or retraction of the quill 12 and the intermediate spindle 51, one of the solenoids 101 and 102 must be energized as well as the solenoid 105. The solenoid 101 is energized for extension while the solenoid 102 is energized for retraction.

As shown in FIG. 7, the solenoid 102, which allows pressurized fluid to be supplied to the cylinder 19 through the valve 100 to advance the quill 12 and the intermediate spindle 51 from the housing 11, is energized only when a pushbutton 106 and the limit switches 90 and 95 are closed along with normally open contacts 107 of a relay 108 being closed and normally closed contacts 109 of a relay 110 being closed. The pushbutton 106 is actuated to cause the quill 12 and the intermediate spindle 51 to extend from the housing 11.

As previously mentioned, the normally closed limit switch 95 is opened only when it is engaged by a cam on the rod 89′ to indicate that the quill 12 and the intermediate spindle 51 are extended the maximum desired distance from the housing 11. As previously set forth, the normally closed limit switch 90 is opened whenever the advancement of the quill 12 and the intermediate spindle 51 reaches the position shown in FIG. 5 relative to the spindle 55.

The relay 108 is picked unless the switch 61′ is open. As previously mentioned, this occurs only when it is desired to move the intermediate spindle 51 axially with the spindle 55 when the adapter plate 60 connects the intermediate spindle 51 to the spindle 55. At all other times, the switch 61′ is in a closed position so that the relay 108 remains energized. Accordingly, the contact 107 of the relay 108 is closed whenever it is desired to advance or retract the quill 12 and the intermediate spindle 51 relative to the spindle 55 and the housing 11.

The relay 110 is energized only when a pushbutton 111, which is closed only when it is desired to retract the quill 12 and the intermediate spindle 51 into the housing 11, is closed along with other contacts and switches in the circuit to the relay 110. Since it is not desired to retract the quill 12 and the intermediate spindle 51 when the quill 12 and the intermediate spindle 51 are to be advanced from the housing 11, the normally closed contacts 109 of the relay 110 remain closed.

Accordingly, when the pushbutton 106 is actuated to cause extension of the quill 12 and the intermediate spindle 51, the solenoid 102 is energized unless one of the limit switches 90 and 95 is open, the contacts 107 of the relay 108 are open, or the contacts 109 of the relay 110 are open. If the limit switch 95 is open, this indicates that the quill 12 is at its maximum extension from the housing 11 so that no further extension is permissible. If the switch 90 is open, this indicates that the spindle 55 has been disposed relative to the intermediate spindle 51 as shown in FIG. 5 so that no further advancement of the quill 12 and the intermediate spindle 51 is permissible until there is advancement of the spindle 55.

If the normally open contacts 107 open, this indicates that the selector switch 61′ has been opened to cause movement of the intermediate spindle 51 with the spindle 55. Likewise, if the contacts 109 are open, this indicates that the push button 111 is in a closed position.

When the solenoid 102 is energized, a relay 112 also is picked. When the relay 112 is picked, this causes opening of normally closed contacts 113 in the circuit for the relay 110 whereby the relay 110 cannot be picked through accidental movement of the pushbutton 111 to a closed position after the pushbutton 106 is moved to a closed position.

As a result of the relay 112 being picked, normally open contacts 114 of the relay 112 are closed to energize the solenoid 105 since normally open contacts 115 of the relay 108 are closed due to the relay 108 being picked. Thus, when the solenoid 102 is energized to cause extension of the quill 12 and the intermediate spindle 51 from the housing 11, the solenoid 105 is energized to immediately remove the fluid from the clamping assembly 31 to allow axial movement of the quill 12 and the intermediate spindle 51. Since the valves 99 and 100 can be positioned to direct fluid to the cylinder 19 only when fluid is removed from the clamping assembly 31, this arrangement ensures that no movement of the quill 12 and the intermediate spindle 51 can occur until the clamping assembly 31 no longer is holding the rod 18 to prevent axial movement of the quill 12 and the intermediate spindle 51.

When the pushbutton 106 is released, the solenoid 102 ceases to be energized whereby advancement of the quill 12 and the intermediate spindle 51 is stopped. Likewise, if either of the limit switches 90 or 95 should open, the solenoid 102 would be deenergized to automatically stop advancement of the quill 12 and the intermediate spindle 51. Since the relay 112 is picked only when the solenoid 102 is energized, any deenergization of the solenoid 102 results in deenergization of the solenoid 105 to again cause the clamping assembly 31 to clamp the rod 18 to prevent axial movement of the quill 12 and the intermediate spindle 51.

When it is desired to retract the quill 12 and the intermediate spindle 51, the pushbutton 111 is actuated. This causes energization of the solenoid 101 if the limit switch 88, normally open contacts 116 of the relay 108, and the normally closed contacts 113 of the relay 112 are closed. As previously mentioned, the normally closed limit switch 88 is opened only when the quill 12 and the intermediate spindle 51 are retracted to the position of FIG. 1. Since the relay 108 is picked unless the selector switch 61′ is open to open the circuit of the relay 108, the normally open contacts 116 of the relay 108 are closed. Since the relay 112 is energized only when the pushbutton 106 is actuated, the normally closed contacts 113 of the relay 112 will remain closed. Therefore, the solenoid 101 is energized when the pushbutton 111 is closed if the switch 88, the contacts 116, and the contacts 113 are closed.

The limit switch 88 is opened only when the quill 12 and the intermediate spindle 51 are in the position of FIGS. 1 and 4 wherein they are in their maximum retracted position. At this time, no further retraction of the quill 12 and the intermediate spindle 51 is permissible so that the solenoid 101 would be deenergized.

When the solenoid 101 is energized, the solenoid 105 also is energized since normally open contacts 118 of the relay 110 are closed by energizing the relay 110 when the solenoid 101 is energized. This closing of the contacts 118 along with the contacts 115 of the relay 108 being closed permits energization of the solenoid 105 to ensure that the clamping assembly 31 releases the quill 12 and the intermediate spindle 51 for axial movement.

When retraction of the quill 12 and the intermediate spindle 51 is to cease, the pushbutton 111 is released. This automatically deenergizes the solenoid 101 and the relay 110. It also results in the solenoid 105 being deenergized since the contacts 118 return to their normally open position.

When the relay 110 is picked, the normally closed contacts 109 in the circuit to the solenoid 102 are opened. This ensures that actuation of the pushbutton 106 will not cause energization of the solenoid 102.

As previously mentioned, the relay 108 has the switch 61′, which is normally closed, in its circuit. The switch 61′ is actuated to open the circuit of the relay 108 only when it is desired to move the intermediate spindle 51 axially with the spindle 55 when the adapter plate 60 connects the intermediate spindle 51 to the spindle 55.

When this is to occur, it is necessary for the solenoid 105 to be energized even though neither of the relays 110 and 112 has been picked. Accordingly, when the selector switch 61' is opened, the deenergization of the relay 108 results in normally closed contacts 119 of the relay 108 closing to provide a circuit through the contacts 119 and the pushbutton 93. This causes energization of the solenoid 105 to release the fluid from the clamping assembly 31. Accordingly, when the switch 61' and the pushbutton 93 are actuated in the manner previously described, the clamping assembly 31 does not clamp the quill 12 and the intermediate spindle 51 against axial movement.

Additionally, energization of the solenoid 105 allows fluid to be supplied from the valve 103 to the valves 99 and 100 to position the valves 99 and 100 so that they are connected to each other whereby fluid may flow from one side or the other of the piston within the cylinder 19. Thus, as the quill 12 and the intermediate spindle 51 move with the spindle 55, the fluid is moved from one side of the piston in the cylinder 19 to the other side through the connecting ports in the valves 99 and 100.

When the adapter plate 60 is removed so that the spindle 55 may move relative to the intermediate spindle 51 and the quill 12, it is necessary to return the spindle 55 with respect to the intermediate spindle 51 and the quill 12 from the position of FIG. 1 to the position of FIG. 5. When the spindle 55 is to move relative to the quill 12 and the intermediate spindle 51, the quill 12 and the intermediate spindle 51 must be held against axial movement with the spindle 55 due to frictional engagement. This is accomplished by moving the pushbutton 93 to an open position with the selector switch 61' still open whereby the solenoid 105 is deenergized to cause the clamping assembly 31 to be effective to lock the quill 12 and the intermediate spindle 51 against axial movement.

Since the limit switch 90 must not be effective until the spindle 55 has returned to the position with respect to the intermediate spindle 51 and the quill 12 as shown in FIG. 5, the selector switch 61' must remain open until the spindle 55 has reached this position. Thus, the selector switch 61' cannot be closed to deenergize the solenoid 105 and allow the clamping assembly 31 to be effective.

An advantage of this invention is that it permits a single spindle to be utilized in a bar-type milling machine for both forming a deep pocket or bore with a small diameter tool while still obtaining high-horsepower cuts with the quill extended for a substantial distance. Another advantage of this invention is that a spindle of the bar-type milling machine may be adequately supported when forming a bore, deep pockets, or a high-horsepower cut.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:
1. A spindle mechanism for a machine tool including:
a quill;
means to allow said quill to move only axially;
an intermediate spindle rotatably mounted within said quill;
a spindle disposed within said intermediate spindle and adapted to have a cutting tool secured thereto;
means to connect said intermediate spindle to said spindle for rotation therewith while permitting relative axial movement therebetween;
means to rotate said spindle and said intermediate spindle;
means to axially move said quill and said intermediate spindle together;
means to prevent axial movement of said quill and said intermediate spindle;
means to render said preventing means effective in response to inactivation of said axially moving means; and means to axially move said spindle independently of said axially moving means for said quill and said intermediate spindle.

2. The spindle mechanism according to claim 1 including:
an adapter plate selectively connected to said intermediate spindle and said spindle to connect said intermediate spindle and said spindle to each other to cause said intermediate spindle to move axially with said spindle;
and means to inactivate said preventing means when said adapter plate connects said intermediate spindle to said spindle.

3. The spindle mechanism according to claim 2 including means to inactivate said axially moving means for said quill and said intermediate spindle when said adapter plate is connected to said intermediate spindle.

4. A spindle mechanism for a machine tool including:
a housing;
a quill supported in said housing;
means to allow said quill to move only axially;
an intermediate spindle rotatably mounted within said quill;
a spindle disposed within said intermediate spindle and adapted to have a cutting tool secured thereto;
means to connect said intermediate spindle to said spindle for rotation therewith while permitting relative axial movement therebetween;
means to rotate said spindle and said intermediate spindle;
means to axially move said quill and said intermediate spindle together;
means to axially move said spindle;
means to control axial movement of said intermediate spindle and said quill from said housing to maintain a predetermined minimum distance between the end of said intermediate spindle and the end of said spindle with the end of said intermediate spindle closer to said housing than the end of said spindle;
means to activate said control means when the predetermined minimum distance is attained;
and means to inactivate said control means to allow the ends of said intermediate spindle and said spindle to be disposed in substantially the same plane.

5. The spindle mechanism according to claim 4 in which said control means also controls retraction of said spindle into said housing with respect to said intermediate spindle and said quill to maintain the predetermined minimum distance between the end of said intermediate spindle and the end of said spindle with the end of said intermediate spindle closer to said housing than the end of said spindle.

6. A spindle mechanism for a machine tool including:
a housing;
a quill supported in said housing;
means to allow said quill to move only axially;
an intermediate spindle rotatably mounted within said quill;
a spindle disposed within said intermediate spindle and adapted to have a cutting tool secured thereto;
means to connect said intermediate spindle to said spindle for rotation therewith while permitting relative axial movement therebetween;
means to rotate said spindle and said intermediate spindle;
means to axially move said quill and said intermediate spindle together;
means to axially move said spindle;
means to control axial movement of said intermediate spindle and said quill from said housing to maintain a predetermined minimum distance between the end of said intermediate spindle and the end of said spindle with the end of said intermediate spindle closer to said housing than the end of said spindle;
an adapter plate selectively connected to said intermediate spindle and said spindle to connect said intermediate spindle and said spindle to each other to cause said intermediate spindle to move axially with said spindle;
and means to inactivate said control means so that said adapter plate can be connected to said intermediate spindle and said spindle.

7. The spindle mechanism according to claim 6 including:

means to prevent axial movement of said quill and said intermediate spindle by said axially moving means for said quill and said intermediate spindle;

means to render said preventing means effective in response to inactivation of said axially moving means for said quill and said intermediate spindle when said adapter plate is not connected to said intermediate spindle and said spindle; and said inactivating means inactivating said preventing means when said control means is inactivated so that said adapter plate can be connected to said intermediate spindle to cause said intermediate spindle to move axially with said spindle said inactivating means being effective as long as said adapter plate is connected to said intermediate spindle and said spindle.

8. A spindle mechanism for a machine tool including:

a housing;

a quill supported in said housing;

means to allow said quill to move only axially;

an intermediate spindle rotatably mounted within said quill;

a spindle disposed within said intermediate spindle and adapted to have a cutting tool secured thereto;

means to connect said intermediate spindle to said spindle for rotation therewith while permitting relative axial movement therebetween;

means to rotate said spindle and said intermediate spindle;

means to axially move said quill and said intermediate spindle together;

means to axially move said spindle;

means to prevent axial movement of said quill and said intermediate spindle by said axially moving means for said quill and said intermediate spindle;

means to render said preventing means effective in response to inactivation of said axially moving means for said quill and said intermediate spindle; and means to control axial movement of said intermediate spindle and said quill from said housing to maintain a predetermined minimum distance between the end of said intermediate spindle and the end of said spindle with the end of said intermediate spindle closer to said housing than the end of said spindle.